(12) United States Patent
Jin et al.

(10) Patent No.: US 10,587,469 B2
(45) Date of Patent: *Mar. 10, 2020

(54) MULTI-PROTOCOL STORAGE NETWORK I/O DEVICES AND METHODS

(71) Applicant: NetApp, Inc., Sunnyvale, CA (US)

(72) Inventors: Tao Jin, Sunnyvale, CA (US); Evan Chiu, Sunnyvale, CA (US); Hua Li, Cary, NC (US); Roland Guioguio, San Jose, CA (US); Wendell Griggs, Nevada City, CA (US); James Loo, Brentwood, CA (US)

(73) Assignee: NetApp, Inc., Sunnyvale, CA (US)

( * ) Notice: Subject to any disclaimer, the term of this patent is extended or adjusted under 35 U.S.C. 154(b) by 434 days.

This patent is subject to a terminal disclaimer.

(21) Appl. No.: 15/054,207

(22) Filed: Feb. 26, 2016

(65) Prior Publication Data

US 2016/0182295 A1 Jun. 23, 2016

Related U.S. Application Data

(63) Continuation of application No. 13/901,307, filed on May 23, 2013, now Pat. No. 9,282,004.

(51) Int. Cl.
| | |
|---|---|
| *H04L 12/24* | (2006.01) |
| *H04L 12/26* | (2006.01) |
| *H04L 29/08* | (2006.01) |
| *H04L 29/06* | (2006.01) |
| *H04L 12/931* | (2013.01) |

(52) U.S. Cl.
CPC ...... *H04L 41/0816* (2013.01); *H04L 41/0813* (2013.01); *H04L 43/16* (2013.01); *H04L 67/1097* (2013.01); *H04L 69/18* (2013.01); *H04L 49/357* (2013.01)

(58) Field of Classification Search
CPC ............. H04L 41/0813; H04L 41/0816; H04L 67/1097; H04L 69/18
USPC ........................................................ 709/221
See application file for complete search history.

(56) References Cited

U.S. PATENT DOCUMENTS

| | | | |
|---|---|---|---|
| 5,842,039 A * | 11/1998 | Hanaway ........... | G05B 19/0426 710/11 |
| 6,389,464 B1 * | 5/2002 | Krishnamurthy ... | H04L 41/0213 709/220 |
| 7,773,521 B2 | 8/2010 | Zhang et al. | |
| (Continued) | | | |

OTHER PUBLICATIONS

Scott, Cisco's Data Center Launch, Mar. 30, 2011, Scott's weblog, https://blog.scottlowe.org/2011/03/30/ciscos-data-center-launch/.*

*Primary Examiner* — Zi Ye
(74) *Attorney, Agent, or Firm* — Pepper Hamilton LLP

(57) ABSTRACT

Systems and methods which allow for one or more input/output (I/O) ports residing on a device in a storage network environment to be reconfigured in order to communicate using different protocols are provided. Embodiments may provide for dynamic reconfiguration of an I/O port while the device including the port is deployed in the storage network. In some instances, such reconfiguration may be managed locally and/or by a remote management processing resource in the storage network. In some embodiments, reconfiguration of an I/O port to communicate in a different protocol may be implemented, either manually or automatically, based on observed traffic data.

21 Claims, 3 Drawing Sheets

(56) References Cited

U.S. PATENT DOCUMENTS

| | | | |
|---|---|---|---|
| 7,936,767 B2 | 5/2011 | Blinick et al. | |
| 8,391,300 B1* | 3/2013 | Dropps | H04L 49/3054 370/351 |
| 2005/0265252 A1* | 12/2005 | Banerjee | H04L 41/08 370/252 |
| 2005/0265377 A1 | 12/2005 | Mizuno et al. | |
| 2006/0098572 A1* | 5/2006 | Zhang | H04L 41/0896 370/229 |
| 2008/0240104 A1* | 10/2008 | Villait | H04L 41/0806 370/392 |
| 2008/0285457 A1* | 11/2008 | Larson | H04L 47/10 370/237 |
| 2009/0234984 A1 | 9/2009 | Chaitanya et al. | |
| 2013/0160001 A1 | 6/2013 | Graham et al. | |
| 2013/0163607 A1 | 6/2013 | Shukla et al. | |
| 2014/0280791 A1 | 9/2014 | Decusatis et al. | |

* cited by examiner

MULTI-PROTOCOL STORAGE NETWORK I/O DEVICES AND METHODS

TECHNICAL FIELD

The present application relates generally to storage networks and, more particularly, to devices in a storage network which are configured to communicate using multiple protocols.

BACKGROUND

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

Digital data stored by data storage systems may be frequently migrated within the data storage system and/or between data storage systems during normal operation. For example, when one or more users desire to access or download files, a portion or even the entire contents of a data volume may be sent across the network to be accessed by the user. Such communications may take place between multiple nodes of the storage network, between a storage array and one or more nodes, between other communication devices on the network (e.g. switches and relays), etc.

Issues arise in such storage networks, however, because the multiple network devices which are present in the storage network may utilize differing protocols to communicate data. For example, communications between one or more devices may utilize fibre channel (FC) protocols, Ethernet protocols, fibre channel over Ethernet (FCoE) protocols, Small Computer Systems Interface (SCSI) protocol encapsulated over TCP (iSCSI) (SCSI/iSCSI) protocols, etc.

Generally, a storage network must utilize multiple input/output (I/O) ports to handle each of these protocols. For example, a device in a storage network may need separate I/O ports to utilize an Ethernet connection and a FC connection. In fact, even with I/O ports that implement FCoE, such ports cannot be utilized to receive a communication which utilizes an FC protocol. Accordingly, when multiple protocols are present within a storage network, additional hardware and communication ports must be utilized and maintained to support these distinct protocols.

BRIEF DESCRIPTION OF THE DRAWINGS

For a more complete understanding, reference is now made to the following descriptions taken in conjunction with the accompanying drawings, in which.

DETAILED DESCRIPTION

The present application provides for systems and methods which allow for one or more I/O ports residing on a device in a storage network environment to be reconfigured in order to communicate using different protocols. Embodiments may provide for dynamic reconfiguration of an I/O port while the device including the port is deployed in the storage network. In some instances, such reconfiguration may be managed by a remote management processing resource in the storage network.

In some embodiments, reconfiguration of an I/O port to communicate in a different protocol may be implemented based on observed traffic data. For example, an I/O port may be configured to communicate using a first protocol, whereupon observed traffic data leads to the conclusion that a second protocol may be desirable. Such observations may be provided to a management processing resource whereupon the I/O port may be reconfigured to utilize the second protocol under the control of the management processing resource.

In some embodiments, a reconfiguration may be initiated by an administrator, or may be automatically implemented. In some aspects, observed traffic data may be compared to a pre-determined threshold to determine whether a reconfiguration is warranted. Threshold values may be set according to any number of factors, e.g. the type and amount of traffic observed, the availability of alternate resources for communications of various protocol types, and the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

Figure 1:
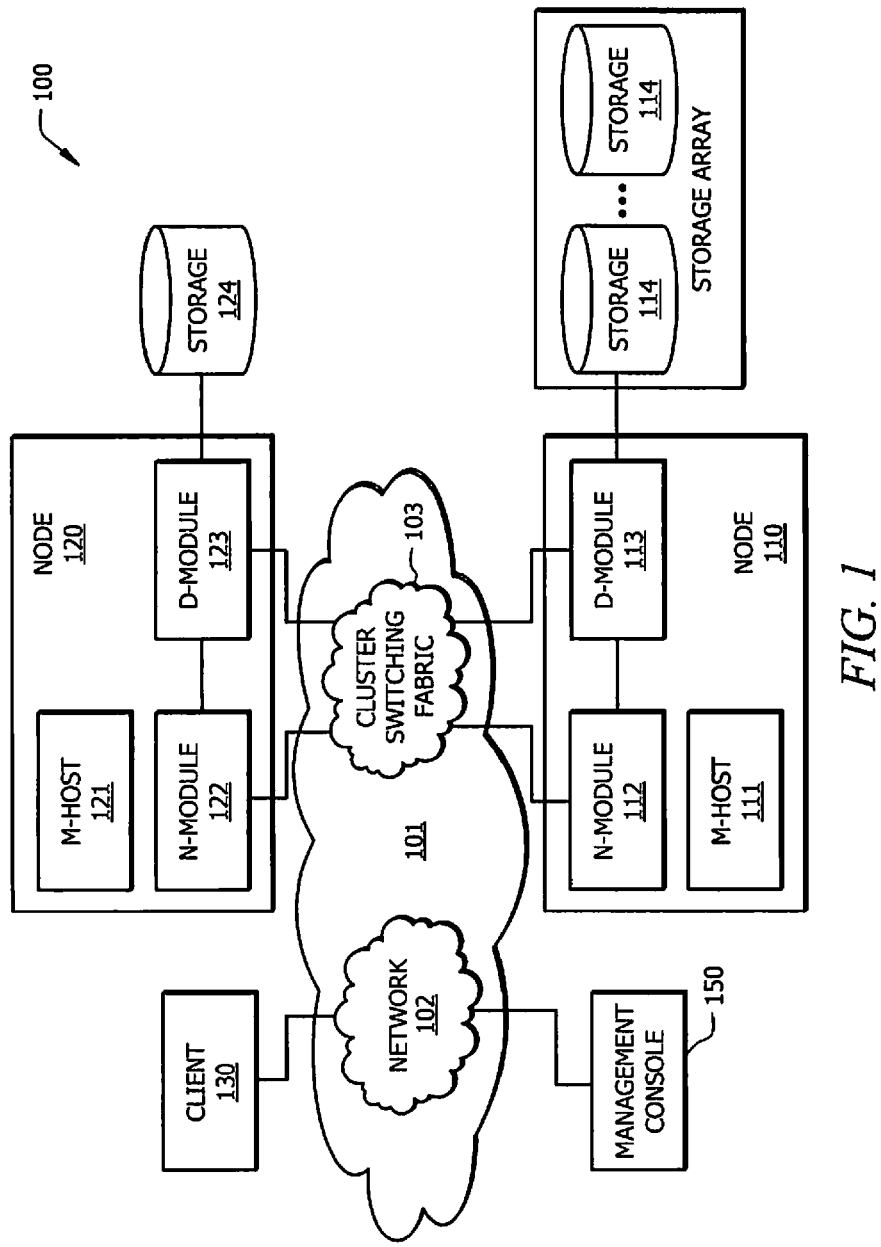
FIG. 1 illustrates a block diagram of storage system in accordance with an embodiment of the present invention.

FIG. 1 provides a block diagram of storage system 100 in accordance with an embodiment of the present invention. System 100 includes a storage cluster having multiple nodes 110 and 120 which are adapted to communicate with each other and any additional node of the cluster. Nodes 110 and 120 are configured to provide access to data stored on a set of storage devices (shown as storage devices 114 and 124) constituting storage of system 100. Storage services may be provided by such nodes implementing various functional components that cooperate to provide a distributed storage system architecture of system 100. Additionally, one or more storage devices, such as storage array 114, may act as a central repository for storage system 100. It is appreciated that embodiments may have any number of edge nodes such as multiple nodes 110 and/or 120. Further, multiple storage arrays 114 may be provided at the multiple nodes 110 and/or 120 which provide resources for mirroring a primary storage data set.

Illustratively, nodes (e.g. network-connected devices 110 and 120) may be organized as one or more network elements (N-modules 112 and 122) and/or storage elements (D-modules 113 and 123) and a management element (M-host 111 and 121). N-modules may include functionality to enable nodes to connect to one or more clients (e.g. network-connected device 130) over computer network 101, while D-modules may connect to storage devices (e.g. as may implement a storage array). M-hosts may provide cluster communication services between nodes for generating information sharing operations and for presenting a distributed file system image for system 100. Functionality for enabling each node of a cluster to receive name and object data, receive data to be cached, and to communicate with any other node of the cluster may be provided by M-hosts adapted according to embodiments of the invention.

It should be appreciated that network 101 may comprise various forms, and even separate portions, of network infrastructure. For example, network-connected devices 110 and 120 may be interconnected by cluster switching fabric 103 while network-connected devices 110 and 120 may be interconnected to network-connected device 130 by a more general data network 102 (e.g. the Internet, a LAN, a WAN, etc.).

It should also be noted that while there is shown an equal number of N- and D-modules constituting illustrated embodiments of nodes, there may be a different number and/or type of functional components embodying nodes in accordance with various embodiments of the present invention. For example, there may be multiple N-modules and/or D-modules interconnected in system 100 that do not reflect a one-to-one correspondence between the modules of network-connected devices 110 and 120. Accordingly, the description of network-connected devices 110 and 120 comprising one N- and one D-module should be taken as illustrative only and it will be understood that the novel technique is not limited to the illustrative embodiment discussed herein.

Network-connected device 130 may be a general-purpose computer configured to interact with network-connected devices 110 and 120 in accordance with a client/server model of information delivery. To that end, network-connected device 130 may request the services of network-connected devices 110 and 120 by submitting a read or write request to the cluster node comprising the network-connected device. In response to the request, the node may return the results of the requested services by exchanging information packets over network 101. Network-connected device 130 may submit access requests by issuing packets using application-layer access protocols, such as the Common Internet File System (CIFS) protocol, Network File System (NFS) protocol, Small Computer Systems Interface (SCSI) protocol encapsulated over TCP (iSCSI), SCSI encapsulated over Fibre Channel (FCP), and SCSI encapsulated over Fibre Channel over Ethernet (FCoE) for instance.

System 100 may further include a management console (shown here as management console 150) for providing management services for the overall cluster. Management console 150 may, for instance, communicate with network-connected devices 110 and 120 across network 101 to request operations to be performed at the cluster nodes comprised of the network-connected devices, and to request information (e.g. node configurations, operating metrics) from or provide information to the nodes. In addition, management console 150 may be configured to receive inputs from and provide outputs to a user of system 100 (e.g. storage administrator) thereby operating as a centralized management interface between the administrator and system 100. In the illustrative embodiment, management console 150 may be networked to network-connected devices 110-130, although other embodiments of the present invention may implement management console 150 as a functional component of a node or any other processing system connected to or constituting system 100.

Management console 150 may also include processing capabilities and code which is configured to control system 100 in order to allow for management of I/O protocol configurations of I/O ports on network-connected devices. For example, device 110 may include a plurality of I/O ports, at least a portion of which are configured to communicate using different protocols. In the event that an administrator desires that an I/O port of device 110 should utilize a different protocol, one or more commands may be provided to network device 110 via management console 150 to reconfigure the I/O port. Management console 150 may further provide any necessary configuration information or driver software to accomplish the reconfiguration. Further, such configuration information may be resident on device 110 whereupon it may be accessed in response to receiving a reconfiguration command, e.g. from management console 150.

In some embodiments, management console 150 may compile data relating to traffic and communication protocols with respect to different I/O ports of network connected devices. Such data may be utilized to determine whether an I/O reconfiguration is warranted, e.g. in the event that traffic loads in a particular protocol are more prevalent and therefore additional I/O ports for that protocol are desired for efficiency purposes. In some instances, pre-determined thresholds may be established with respect to traffic loads within protocols. Actual traffic data from the storage network may be compared to these thresholds to make a determination regarding whether a port reconfiguration is desired.

In a distributed architecture, network-connected device 130 may submit an access request to a node for data stored at a remote node. As an example, an access request from network-connected device 130 may be sent to network-connected device 120 which may target a storage object (e.g. volume) on network-connected device 110 in storage 114. This access request may be directed through network-connected device 120 due to its proximity (e.g. it is closer to the edge than a device such as network-connected device 110) or ability to communicate more efficiently with device 130. To accelerate servicing of the access request and optimize cluster performance, network-connected device 120 may cache the requested volume in local memory or in storage 124. For instance, during initialization of network-connected device 120 as a cluster node, network-connected device 120 may request all or a portion of the volume from network-connected device 110 for storage at network-connected device 120 prior to an actual request by network-connected device 130 for such data.

As can be appreciated from the foregoing, in order to operate as a cluster (e.g. the aforementioned data storage system), network-connected devices 110-130 may communicate with each other. Such communication may include various forms of communication (e.g. point-to-point or unicast communication, multicast communication, etc.). Such communication may be implemented using one or more protocols such as CIFS protocol, NFS, iSCSI, FCP, FCoE, and the like. Accordingly, to effectively cooperate to provide desired operation as a logical entity, each node of a cluster is provided with the capability to communicate with any and all other nodes of the cluster according to embodiments of the invention.

Figure 2:
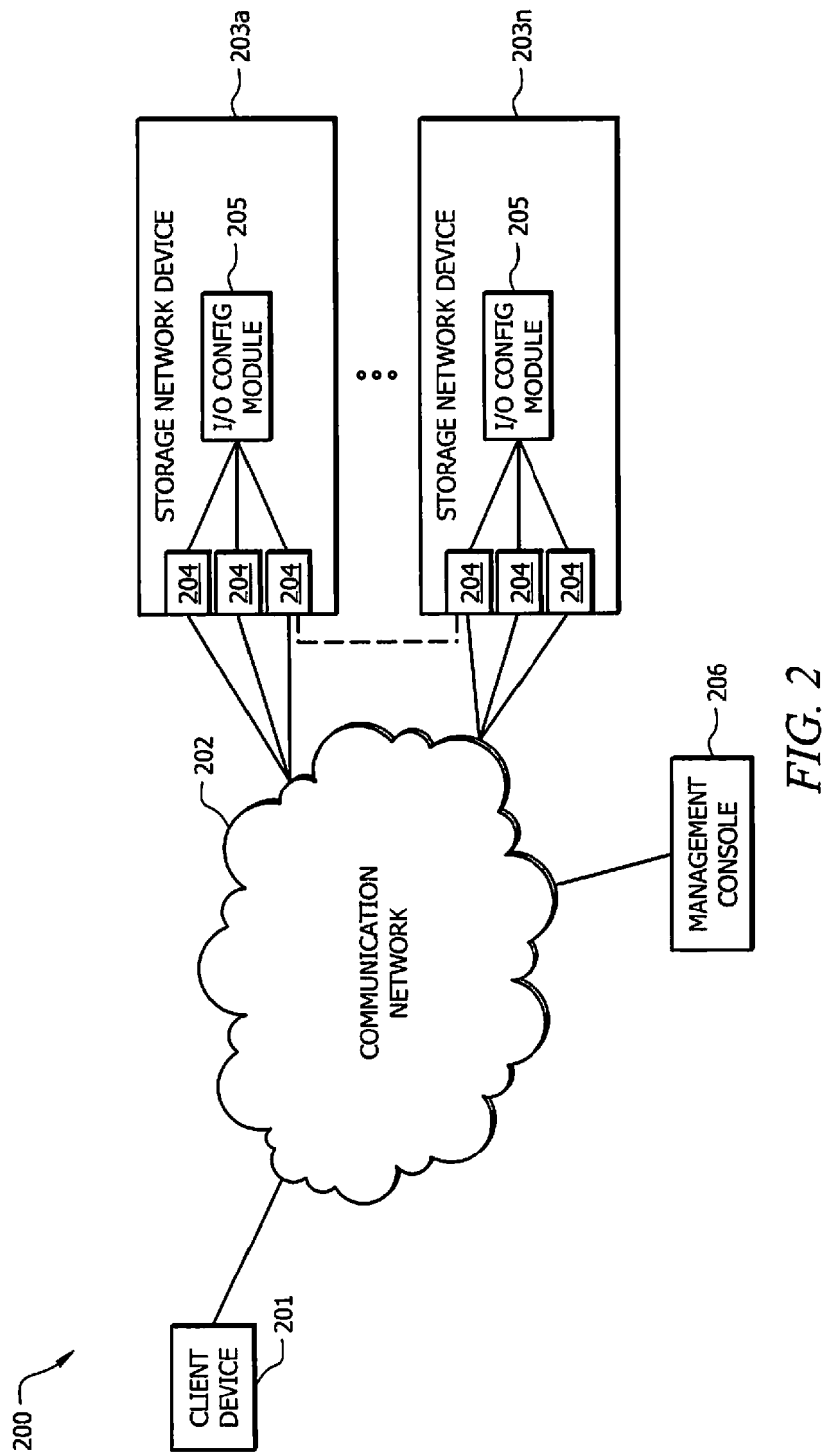
FIG. 2 illustrates a block diagram of storage system in accordance with an embodiment of the present invention.

FIG. 2 illustrates a block diagram of storage system 200 in accordance with an embodiment of the present invention. System 200 includes a client device 201, communication network 202 and storage network devices 203a-203n. Client device 201 may read or write data to a storage network device, e.g. device 203a, over communication network 202.

Communication network 202 may include any type of network such as the Internet, WiFi, mobile communications networks such as GSM, CDMA, 3G/4G, WiMax, LTE and the like. Further communication network 202 may comprise a combination of network types working collectively.

Storage network devices 203a-203n may include devices discussed with respect to FIG. 1, such as nodes, storage arrays, and the like. Storage network devices 203a-203n may include a plurality of I/O ports 204 and in some cases may include an I/O port configuration module 205. I/O ports 204 may include one or more ports which may be reconfigurable to allow for the I/O port to utilize different communications protocols. For example I/O ports 204 may include a port configured to utilize an FCoE protocol for communications, and another port which is configured to utilize an FC protocol. In some embodiments, the FCoE port may be reconfigured to function as an FC port, or vice versa. Such a reconfiguration may utilize information from I/O port configuration module 205, from management console 206, and/or from a combination of both. It is noted that I/O configuration module 205 may be implemented on the hardware which comprises the I/O port (e.g. on a PCI card) and that each I/O port may include a configuration module.

Communications from client device 201 may be presented to storage network device 203 utilizing one or more protocols, such as CIFS protocol, NFS, iSCSI, FCP, FCoE, and the like. Additionally, storage network devices 203a-203n may be in communication with each other utilizing one or more protocols, such as Fiber Channel Virtual Interface (FCVI), and the like.

Management console 206 may be implemented as discussed above with respect to management console 150. Further, as discussed above, management console 206 may be implemented, completely or in part, within processing resources of storage network device 203.

In order to reconfigure an I/O port 204 to utilize a different protocol, management console 206 may utilize I/O configuration module 205. I/O reconfiguration module 205 may compile data regarding traffic flow within ports of a storage network device (alternatively, such information may be compiled directly by management console 206). With this data, a determination may be made to reconfigure one or more I/O ports 204 to accommodate a different protocol. This determination may be implemented by I/O configuration module 205, or by management console 206. Further, the determination may be automatically made in response to meeting conditions regarding traffic for a particular protocol, or may be manually determined by an administrator for the storage network.

Once the determination is made to reconfigure an I/O port to utilize a different protocol, configuration information (e.g. driver information and the like) may be provided to I/O configuration module and be utilized to reconfigure the port. Alternatively, the reconfiguration information may be resident on I/O configuration module 205 and may be utilized in response to a command from management console 206.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3:
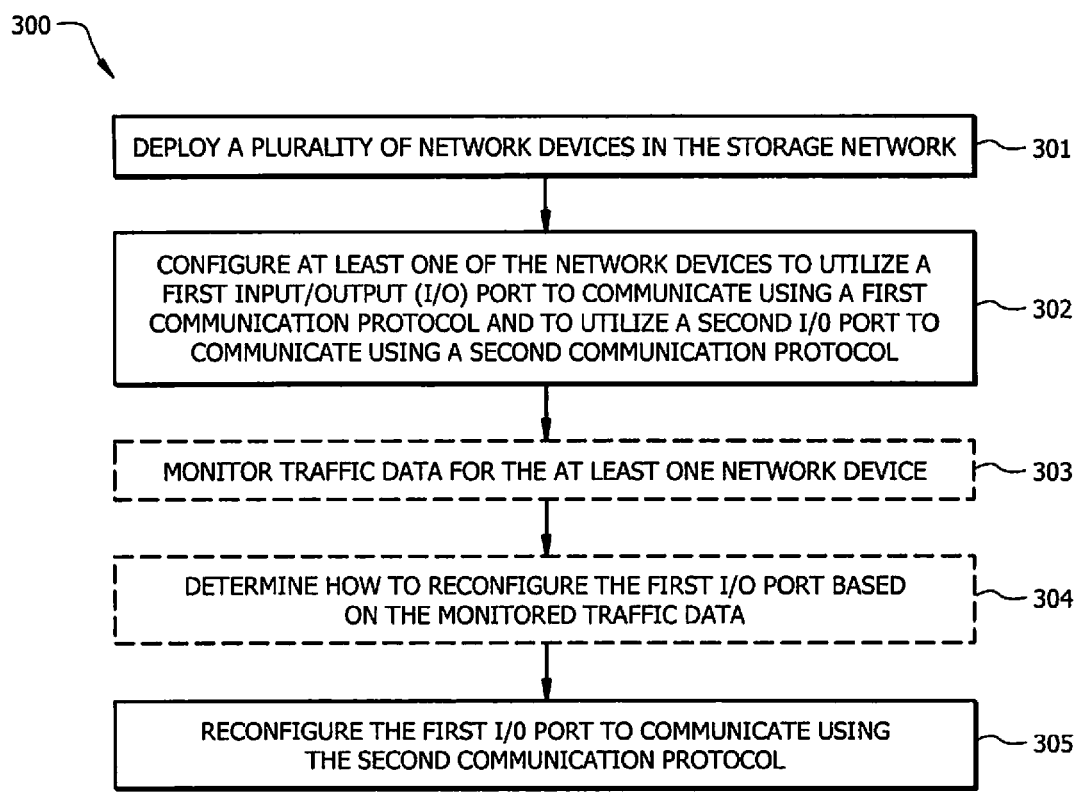
FIG. 3 illustrates an example flow for a method in accordance with an embodiment of the present invention.

FIG. 3 illustrates a method 300 for managing communications in a storage network in accordance with an embodiment of the present application. It is noted that embodiments of method 300 may be implemented within the storage networks described above with respect to FIGS. 1-2. Specifically, method 300 may include, at block 301, deploying a plurality of network devices in the storage network. Such network devices may include devices such as the nodes and storage arrays described above with respect to FIGS. 1-2. Method 300 may include, at 302, configuring at least one of the network devices to utilize a first input/output (I/O) port to communicate using a first communication protocol and to utilize a second I/O port to communicate using a second communication protocol. For example, a first I/O port may communicate using an FC protocol where the second I/O port may communicate using an Ethernet or an FCoE protocol.

Method 300 may further include an optional step, at 303, of monitoring traffic data for the at least one network device. Traffic data monitored may include data regarding the amount of traffic directed to one or more I/O ports of a device, the amount of traffic directed to a device in a particular protocol, and the like. Another optional step may be included at 304 of determining to reconfigure the first I/O port based on the monitored traffic data. Such a determination may be made taking into account various considerations, e.g. the lack of use or overuse of a particular port, the need for additional resources to handle communications of a particular protocol, etc.

Method 300 may further include, at 305, reconfiguring the first I/O port to communicate using the second communication protocol. For example, if the first I/O port was originally configured to utilize an FC communication protocol, the port may be reconfigured to utilize, e.g., an FCoE or Ethernet protocol.

It is noted that in more detailed aspects methods may include providing configuration information to the network device. Such information may include driver programming, instructions/information regarding transitioning between communications protocols, and the like. Further, methods may include further reconfigurations, e.g. to cause the first I/O port to again communicate using the first communications protocol or to utilize a third protocol type.

Those of skill would further appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is also appreciated that the systems and method described herein are able to be scaled for larger storage network systems. For example, a cluster may include hundreds of nodes, multiple virtual servers which service multiple clients and the like. Such modifications may function according to the principles described herein.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
    configuring, by a computing device, first and second ports of a storage network device to communicate using first and second communication protocols, respectively;
    monitoring, by the computing device, received network traffic to determine an amount of the network traffic that is associated with the second communication protocol; and
    reconfiguring, by the computing device, the first port to communicate using the second communication protocol when the amount of the network traffic that is associated with the second communication protocol exceeds a threshold and based on availability of an additional port to handle the first communication protocol.

2. The method of claim 1 wherein the first communication protocol is a Fibre Channel protocol and the second communication protocol is an Ethernet protocol.

3. The method of claim 1 wherein configuration information to configure the first port to communicate using the second protocol is provided by a device of a storage network.

4. The method of claim 3 wherein the configuration information includes driver instructions for the first port that are provided by a management console.

5. The method of claim 1 wherein the second amount of the received network traffic associated with the second communication protocol is received at the second port and one or more other ports of the storage network device that are configured to communicate using the second communication protocol.

6. The method of claim 1 further comprising reconfiguring, by the computing device, the first port to communicate using a third communication protocol.

7. The method as set forth in claim 1 wherein the second communication protocol is a Fibre Channel over Ethernet protocol.

8. A non-transitory computer readable medium having stored thereon instructions for managing communications in a storage network comprising machine executable code which when executed by at least one processor, causes the processor to:
    configure first and second ports of a storage network device to communicate using first and second communication protocols, respectively;
    monitor received network traffic to determine an amount of the network traffic that is associated with the second communication protocol; and
    reconfigure the first port to communicate using the second communication protocol when the amount of the network traffic that is associated with the second communication protocol exceeds a threshold and based on availability of an additional port to handle the first communication protocol.

9. The medium as set forth in claim 8 wherein the first communication protocol is a Fibre Channel protocol and the second communication protocol is an Ethernet protocol.

10. The medium as set forth in claim 8 wherein configuration information to configure the first port to communicate using said second protocol is provided by a device of a storage network.

11. The device as set forth in claim 10 wherein the configuration information includes driver instructions for the first port that are provided by a management console.

12. The medium as set forth in claim 8 wherein the second amount of the received network traffic associated with the second communication protocol is received at the second port and one or more other ports of the storage network device that are configured to communicate using the second communication protocol.

13. The medium as set forth in claim 8 wherein the machine executable code, when executed by the processor, further causes the processor to reconfigure the first port to communicate using a third communication protocol.

14. The medium as set forth in claim 8 wherein the second communication protocol is a Fibre Channel over Ethernet protocol.

15. A computing device comprising:
    a memory containing a machine-readable medium comprising machine executable code having stored thereon instructions for managing communications in a storage network; and
    a processor coupled to the memory, the processor configured to execute the machine executable code to cause the processor to:
        configure first and second ports of a storage network device to communicate using first and second communication protocols, respectively;

monitor received network traffic to determine an amount of the network traffic that is associated with the second communication protocol; and reconfigure the first port to communicate using the second communication protocol when the amount of the network traffic that is associated with the second communication protocol exceeds a threshold and based on availability of an additional port to handle the first communication protocol.

16. The device as set forth in claim 15 wherein the first communication protocol is a Fibre Channel protocol and the second communication protocol is an Ethernet protocol.

17. The device as set forth in claim 15 wherein configuration information to configure the first port to communicate using said second protocol is provided by a device of a storage network.

18. The medium as set forth in claim 17 wherein the configuration information includes driver instructions for the first port that are provided by a management console.

19. The device as set forth in claim 15 wherein the second amount of the received network traffic associated with the second communication protocol is received at the second port and one or more other ports of the storage network device that are configured to communicate using the second communication protocol.

20. The device as set forth in claim 15 wherein the processor is further configured to execute the machine executable code to reconfigure the first port to communicate using a third communication protocol.

21. The device as set forth in claim 15 wherein the second communication protocol is a Fibre Channel over Ethernet protocol.

* * * * *